US 6,736,024 B1

(12) United States Patent
Spence et al.

(10) Patent No.: US 6,736,024 B1
(45) Date of Patent: May 18, 2004

(54) METHOD AND APPARATUS FOR DETERMINING THE POSITION OF A SHIFT RAIL

(75) Inventors: Kevin Spence, Ann Arbor, MI (US); John Kozar, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/490,935

(22) Filed: Jan. 25, 2000

(51) Int. Cl.[7] ............................................... F16H 59/00
(52) U.S. Cl. ..................... 74/473.1; 74/335; 74/473.36; 324/207.23; 340/456
(58) Field of Search ................................ 74/473.1, 335, 74/337.5, 473.12, 473.11, 473.36; 340/686.1, 686.3, 456; 324/207.23, 207.24, 207.25; 250/231.13, 231.18

(56) References Cited

U.S. PATENT DOCUMENTS

| 3,419,798 A | * | 12/1968 | Walton ..................... 340/686.6 |
| 4,500,870 A | * | 2/1985 | Krohn et al. ........... 250/231.13 |
| 4,679,029 A | * | 7/1987 | Krohn et al. ........... 256/231.13 |
| 4,752,732 A | * | 6/1988 | Van Schoiack et al. . 324/207.18 |
| 4,922,199 A | * | 5/1990 | Fukui et al. ............ 324/207.25 |
| 5,510,781 A | * | 4/1996 | de Buda et al. ........ 250/231.13 |
| 5,742,161 A | * | 4/1998 | Karte ..................... 324/207.16 |
| 5,845,538 A | | 12/1998 | Tornatore |
| 5,916,326 A | * | 6/1999 | Tischer ........................ 74/335 |
| 6,105,448 A | * | 8/2000 | Borschert et al. ............. 74/335 |
| 6,253,460 B1 | * | 7/2001 | Schmitz .................. 324/207.24 |

FOREIGN PATENT DOCUMENTS

| JP | 10-218495 | * | 8/1998 |
| WO | WO 97/23763 | * | 7/1997 |

* cited by examiner

Primary Examiner—William C. Joyce
(74) Attorney, Agent, or Firm—David B. Kelley

(57) ABSTRACT

An apparatus 10 for determining the position of a shift rail 12 which is employed within a vehicle having a transmission 14. Apparatus 10 includes an offset lever or member 18, and a pair of proximity sensors 30, 32 which detect the distance between the sensors 30, 32 and the respective surfaces 21, 23 of member 18, and which selectively generate signals corresponding to the measured distances. A controller 38 receives the generated signals and utilizes the signals to determine the linear and angular position of shift rail 12.

16 Claims, 3 Drawing Sheets

METHOD AND APPARATUS FOR DETERMINING THE POSITION OF A SHIFT RAIL

FIELD OF THE INVENTION

This invention relates to a method and an apparatus for determining the position of a shift rail and more particularly, to a method and an apparatus for determining the linear and rotational position or orientation of a shift rail within a vehicle transmission system.

BACKGROUND OF THE INVENTION

Shift rails are utilized within vehicle transmissions, such as automated manual transmissions, to selectively transfer or transmit movement from an actuator to one or more transmission shift members or forks in order to synchronize the engagement of the gears within the transmission. Automated manual transmissions typically include a transmission control system that selectively controls an actuator which selectively actuates the shift rail and which causes the shift rail to move in a linear direction and/or a rotational direction, thereby changing or altering the "gear engagement" of the transmission (e.g., the gear which is currently being used by the transmission).

In order to properly operate and control the transmission system, the current the gear engagement status or operating position of the transmission (e.g., whether the transmission is operating in "first" gear, "second" gear, "third" gear, "fourth" gear, "fifth" gear, "sixth" gear, "reverse", or "neutral") must be determined and communicated to the transmission control system. The current gear engagement status or position is typically determined by observing or measuring the linear and rotational position and/or orientation of the transmission shift rail. Particularly, the "rotational" position of the shift rail corresponds to and/or indicates the selection of a certain gear row or "gate" within the transmission gear box (e.g., the first/second gear gate, the third/fourth gear gate, or the fifth/sixth gear gate), while the "linear" position of the shift rail corresponds to and/or indicates the specific gear that is engaged within the selected row or gate.

Several methods, systems and apparatuses have been utilized to determine the position of the shift rail within these types of transmission systems. These prior shift rail position detecting methods, systems and apparatuses typically utilize an "offset lever" which is fixedly connected to a portion of the transmission shift rail, and which linearly and rotationally moves with the shift rail. These offset levers typically include a series of wires and/or angled portions that are physically and electrically coupled to one or more sensors which are disposed within the transmission housing. The sensors measure and/or detect the position and/or movement the offset lever the physical and electrical contact between the sensors and the offset lever. The sensors generate and communicate one or more electrical signals to the transmission control system or a portion of the transmission control system, which utilizes the received signals to determine the position of the shift rail and the present gear engagement of the transmission.

These prior methods, systems and apparatuses for determining the position of a shift rail suffer from several drawbacks. For example and without limitation, the sensors utilized by these prior systems must directly and physically contact the offset lever in order to determine the spatial orientation or position of the offset lever. To achieve this direct and physical contact between the sensors and the offset lever, additional and relatively complex moving connectors or connecting components must be produced and/or provided which undesirably increase the overall production cost of the transmission system. Furthermore, the contact between the offset lever, sensors, and the associated connecting components subjects these parts to potential wear, fatigue, and malfunction, which can lead to the overall "breakdown" and/or failure of the shift rail position detection system or apparatus.

There is therefore a need for a new and improved method and apparatus for determining the position of a transmission shift rail which overcomes many, if not all, of the previously delineated drawbacks of prior shift rail position detection methods, systems and apparatuses.

SUMMARY OF THE INVENTION

It is a first object of the invention to provide a method and an apparatus for determining the position of a transmission shift rail which overcomes at least some of the previously delineated drawbacks of prior shift rail position detection methods, systems and apparatuses.

It is a second object of the invention to provide a method and an apparatus for determining the position of a transmission shift rail which minimizes the overall cost required to accurately determine the position of a transmission shift rail.

It is a third object of the invention to provide a method and an apparatus for determining the position of a transmission shift rail which eliminates and/or reduces the amount of moving and/or contacting parts which are required to determine the position of the shift rail.

According to a first aspect of the invention, an apparatus for measuring the position of a shift rail is provided. The shift rail is contained within a transmission assembly having a housing. The apparatus includes a member which is disposed around the shift rail and which has at least one surface; at least one sensor which is disposed within the housing, which remotely measures a distance between the at least one surface and the at least one sensor, and which selectively generates a signal having a value based upon the distance; and a controller which is communicatively coupled to the at least one sensor and which receives the signal. The controller is effective to determine the position of the shift rail based upon the value of the signal.

According to a second aspect of the invention, a method for determining the position of a shift rail is provided. The method includes the steps of: providing a member having at least one surface; providing at lease one proximity sensor; mounting the member to the shift rail; disposing the at least one proximity sensor remote from the at least one surface; remotely measuring the distance from the at least one sensor to the at least one surface; and determining the position of the shift rail based upon the measured distance.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
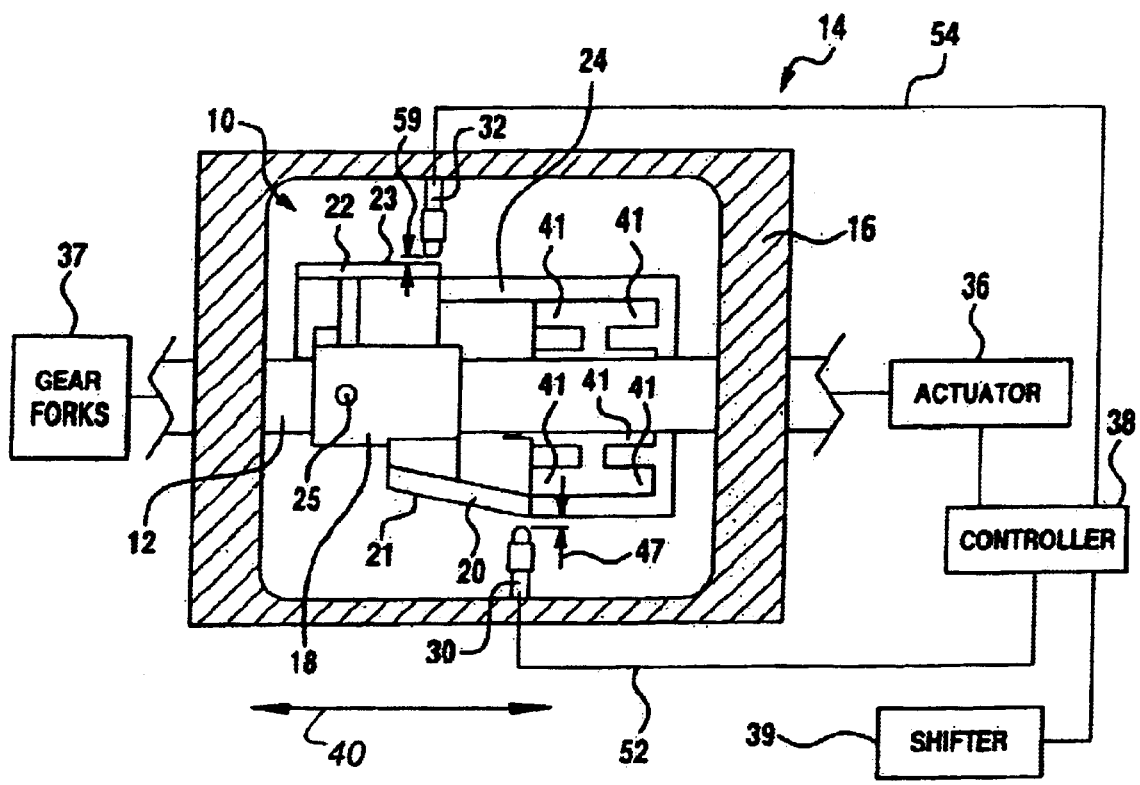
FIG. 1 is a top view of an apparatus used to determine the position of a transmission shift rail which is made in accordance with the teachings of the preferred embodiment of the invention, and which illustrates the shift rail in a first linear position.

Referring now to FIGS. 1–6, there is shown an assembly, system or apparatus 10 for determining the position or "spatial orientation" of a transmission shift rail 12. In the preferred embodiment of the invention, the shift rail 12 is operatively disposed within a vehicle of the type having a conventional automated manual transmission system or assembly 14, a housing 16, gear selection forks or members 37, a shift rail actuator 36, a transmission control system or controller 38, and a shift selecting mechanism or assembly 39.

Apparatus 10 includes an offset lever or member 18 which is disposed around and which is fixedly coupled to the shift rail 12, and a pair of sensors 30, 32 which are fixedly mounted and/or disposed within housing 16. As discussed more fully and completely below, apparatus 10 determines the angular and linear position of shift rail 12 by measuring the distance between member 18 and sensors 30, 32, and utilizes measured position of shift rail 12 to determine the gear engagement of transmission assembly 14 (e.g., the gear engagement in which transmission assembly 14 is operating).

Shift rail 12 is operatively connected, attached or coupled to actuator 36 and to conventional gear forks or gear shifting members 37. Controller 38 selectively operates and/or controls actuator 36 in response to an operator or user engaging or moving shifter 39. Particularly, actuator 36 selectively actuates shift rail 12 and moves the shift rail 12 and forks 37, in a known and conventional manner, thereby shifting and/or engaging various gears (not shown) within the transmission assembly 14 and causing transmission assembly 14 to selectively operate in various gear engagements. In the preferred embodiment, controller 38 may include one or more microprocessors and/or integrated circuits which cooperatively control the movement of actuator 36 and shift rail 12. Housing 16 includes a "detent" or grooved plate 24 which is operatively disposed within and/or is integrally formed with housing 16. Plate 24 includes several grooves 41 which are arranged in a conventional manner (e.g., in several rows or "gates") and which each corresponds to a unique or particular gear engagement of the transmission (e.g., first gear, second gear, third gear, fourth gear, fifth gear, sixth gear and reverse).

Offset lever or member 18 is fixedly connected to shift rail 12 by use of a conventional and commercially available fastener or pin 25. Offset lever or member 18 comprises a first "longitudinally ramped" or curved portion 20 having a generally semi-conical or longitudinally ramped, tapered or angled surface 21 (e.g., the distance 70 between surface 21 and the longitudinal axis 68 of shift rail 12 varies over the length of member 18 and portion 20), and a second "radially" or "angularly ramped" or curved portion 22 having a radially tapered, ramped or angled surface 23 (e.g., the distance 72 between surface 23 and longitudinal axis 68 varies along the perimeter or circumference of portion 22, as shown best in FIGS. 5 and 6). Member 18 further includes a protuberance or extending portion 26 which selectively engages "detent plate" or grooved member 24. It should be appreciated that the "gear engagement" of the transmission 14 is indicated in a known manner by the particular groove 41 in which portion 26 resides (e.g., whether transmission 14 is operating in first gear, second gear, third gear, fourth gear, fifth gear, sixth gear, reverse, or neutral). It should further be appreciated that the member 18 is selectively movable between several linear and rotational positions in which portion 26 engages a unique one of grooves 41. Hence, it should be appreciated that the gear engagement of transmission assembly 14 can be derived in a known manner by use of the rotational and linear orientation or position of member 18.

Sensors 30, 32 are each operatively and conventionally mounted within housing 16 and are operatively disposed on opposite sides of member 18. sensors 30 and 32 are each conventional and commercially available "proximity" sensors, which are respectively adapted to remotely sense or measure the distance between surfaces 21, 23 and sensors 30, 32. In the preferred embodiment, sensors 30, 32 each comprise a conventional inductive type sensor and surfaces 21, 23 are coated with and/or formed from a metallic or magnetic material. In other non-limiting embodiments, sensors 30, 32 comprise conventional optical or light proximity detection sensors, or conventional linear voltage displacement transducer type sensors. Sensors 30, 32 are respectively communicatively and electrically coupled to controller 38 by use of communication paths or busses 52, 54. Sensors 30, 32 selectively and respectively generate voltage signals in response to the sensed or detected distance between surfaces 21 and 23 and sensors 30 and 32, and communicate these signals to the controller 38 by use of busses 52, 54. It should be appreciated that sensors 30, 32 respectively and remotely sense the distances to surfaces 21 and 23, and do not touch or contact member 18 or shift rail 12. As more fully described below, sensors 30, 32 are utilized to determine the linear and angular orientation or position of member 18, thereby allowing controller 38 to derive the present gear engagement of transmission assembly 14 (i.e., the angular and linear positions or orientations of the shift rail 12 and member 18 cooperatively indicate the present gear engagement of transmission 14).

In operation, the movement of the shift rail 12 causes the member 18 to move in a corresponding manner. Particularly, actuator 36 selectively causes shift rail 12 and member 18 to move in a linear direction with respect to axis of symmetry 68 (i.e., the direction illustrated by arrows 40), and/or in a radial or rotational direction with respect to the axis of symmetry 68 (i.e., the direction illustrated by arrows 50).

As shift rail 12 and member 18 move in this manner, sensor 30 detects or measures the distance between the angled or tapered surface 21 of portion 20 and sensor 30, which corresponds to the linear position of member 18 and shift rail 12. Particularly, member 18 and shift rail 12 are linearly movable from a first linear position (illustrated in FIG. 1) in which the distance 47 between sensor 30 and surface 21 of portion 20 is relatively "narrow" or small (e.g., approximately two millimeters) to a second linear position (illustrated in FIG. 2) in which the distance 49 between sensor 30 and surface is relatively wide or "large" (e.g., approximately seven millimeters).

Figure 5:
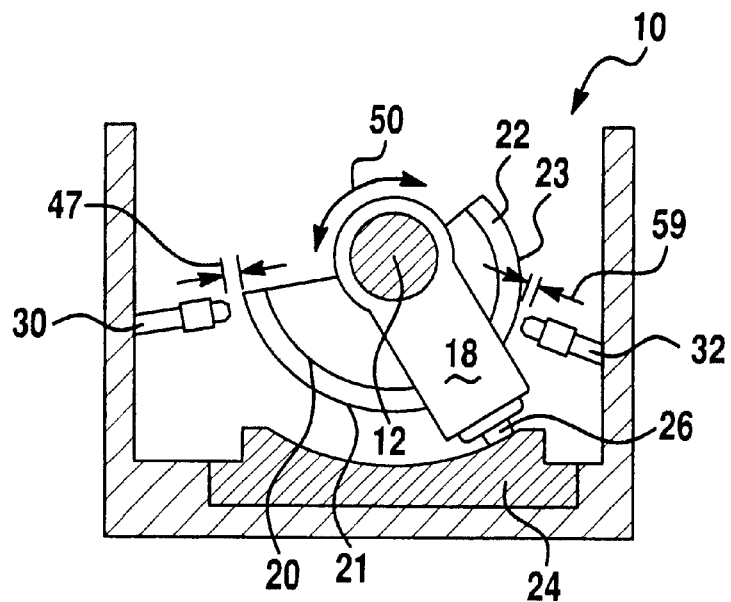
FIG. 5 is a front view of the apparatus shown in FIG. 1 with the offset lever shown in a first angular position.
Figure 6:
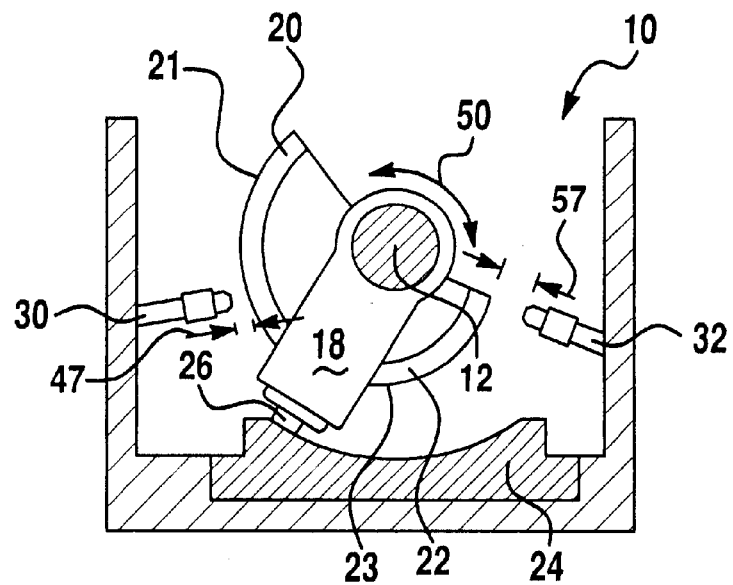
FIG. 6 is a front view of the apparatus shown in FIG. 1 with the offset lever shown in a second angular position.

It should be appreciated that due to the "longitudinally ramped" or semi-conical shape of portion 20, the distance between surface 21 and sensor 30 varies based upon the linear position of member 18 (e.g., as shift rail 12 and member 18 move from the first linear position to the second linear position the distance between sensor 30 and the surface 21 of portion 20 gradually increases). It should further be appreciated that the distance between surface 21 and sensor 30 remains substantially constant when only the angular or rotational position of member 18 is changed (e.g., distance 47, shown in FIGS. 5 and 6, is substantially identical for different angular positions of member 18 when the linear position of member 18 remains constant). Sensor 30 communicates the measured or detected linear position of member 18 by use of a voltage signal having a value which corresponds to the measured distance (e.g., distance 47).

In one non-limiting embodiment, the value of the voltage signal generated by sensor 30 when shift rail 12 and member 18 are in the first linear position (e.g., representing distance 47) is about zero volts, and the value of the voltage signal generated by sensor 30 when shift rail 12 and member 18 are in the second linear position (e.g., representing distance 49) is about 5 volts. If member 18 is in a linear position which is located between or which is substantially equidistant from the first and second linear position, the value of the voltage signal is approximately equal to 2.5 volts. In one non-limiting embodiment, a voltage signal value of about zero volts represents a gear engagement of first gear, third gear, fifth gear, or reverse (depending on the angular position of member 18); a voltage signal value of about five volts represents a gear engagement of second gear, fourth gear, or sixth gear (depending on the angular position of member 18); and a voltage signal value of about 2.5 volts represents a "neutral" gear engagement. In order to determine the specific gear engagement of the transmission 14, apparatus 10 further measures the angular or radial position of member 18.

Apparatus 10 utilizes sensor 32 to determine the angular or radial position or orientation of the member 18 and of the shift rail 12. As shown in FIG. 5, when shift rail 12 and member 18 are in a first radial or angular position, the distance 59 between sensor 32 and portion 22 is relatively "narrow" or small (e.g., about two millimeters), and when member 18 and shift rail 12 are selectively moved or rotated to a second radial or angular position, as illustrated in FIG. 6, the distance 57 between sensor 32 and portion 22 is relatively "wide" or large (e.g., about seven millimeters). In the preferred embodiment, member 18 also selectively resides in third and fourth radial positions which are located "between" the first and second radial position.

Figure 2:
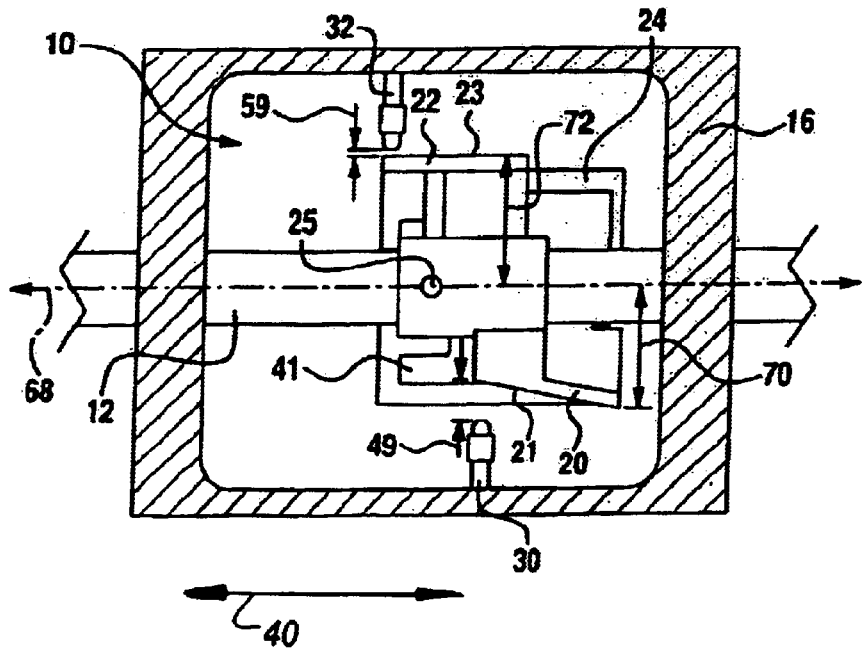
FIG. 2 is a top view of the apparatus shown in FIG. 1 with the offset lever shown in a second linear position.
Figure 3:
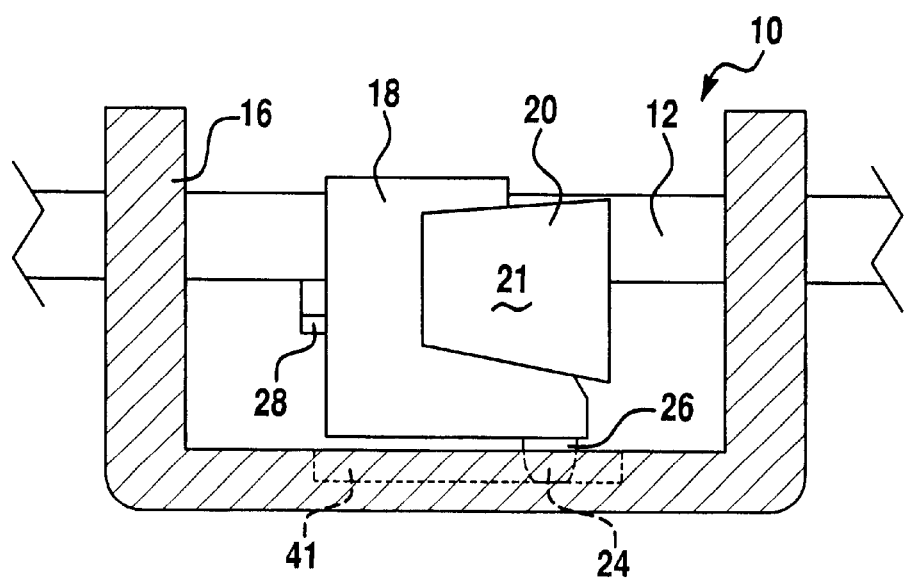
FIG. 3 is a side view of the apparatus shown in FIG. 1.
Figure 4:
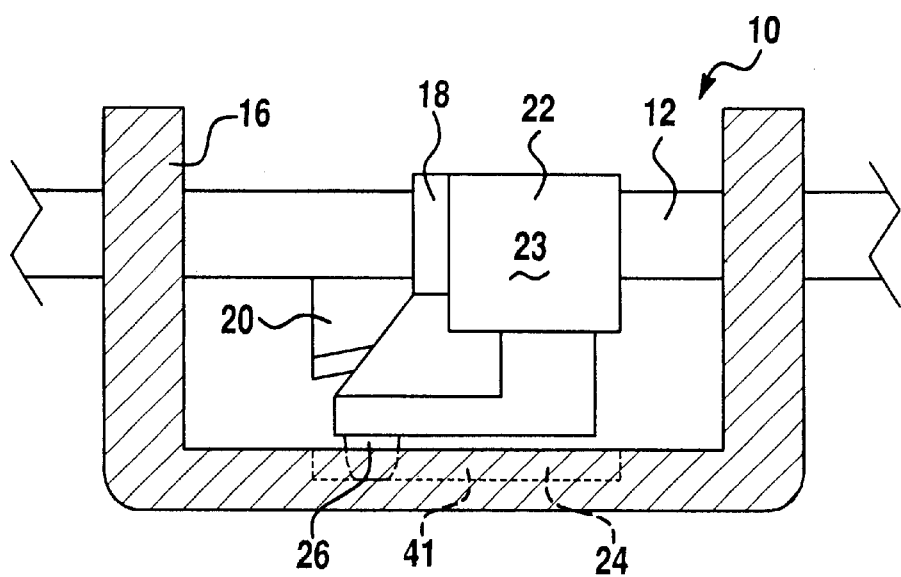
FIG. 4 is a side view of the apparatus shown in FIG. 3 which is taken from an opposing side of the apparatus.

It should be appreciated that due to the radially "ramped" or tapered shape of portion 22, the distance between surface 23 and sensor 32 varies based upon the angular or radial position of member 18 (e.g., as shift rail 12 and member 18 rotate from the first radial position to the second radial position the distance between sensor 32 and the surface 23 of portion 22 gradually increases). It should further be appreciated that the distance between surface 23 and sensor 32 remains substantially constant when only the linear position of member 18 is changed (e.g., distance 59, shown in FIGS. 1 and 2, is substantially identical for different linear positions of member 18 when the angular or radial position of member 18 held constant). Sensor 32 communicates the measured or detected angular or radial position of member 18 by use of a voltage signal having a value which corresponds to the measured distance (e.g., distance 59).

In one non-limiting embodiment, the value of the voltage signal generated by sensor 32 when member 18 is in the first radial position (e.g., corresponding to distance 59) is about zero volts; the value of the voltage signal generated by sensor 32 when member 18 is in the second radial position (e.g., corresponding to distance 57) is about five volts; and the value of the voltage signals generated when member 18 is in the third and fourth radial positions are respectively about 1.5 volts and 3.5 volts. The radial position of member 18 and the corresponding value of the generated voltage signal represents the gear "gate" or row which is presently occupied and/or engaged by portion 26.

In one non-limiting embodiment, a voltage signal value of zero volts corresponds to a "first/second" gear gate; a voltage signal value of 1.5 volts corresponds to a "third/fourth" gear gate; a voltage signal value of 3.5 volts corresponds to a "fifth/sixth" gear gate, and voltage signal value of 5 volts corresponds to a "reverse" gear gate.

Controller 38 utilizes the voltage signals which are generated by sensors 30, 32 to determine the linear and angular position state of the member 18 which respectively correspond to the gear and gear gate engagement of transmission 14. Controller 38 then determines the gear engagement of the transmission assembly 14 by referencing one or more stored database tables or matrixes that contain gear engagement states or values which are cross-referenced in a conventional manner using the measured linear and angular position and/or voltage values.

It should be appreciated that sensors 30, 32 do not require additional connecting components to sense the position of member 18 and utilize a minimal amount of moving parts, thus reducing the overall cost of determining the position of shift rail 12. Furthermore, due to the remote or "passive" proximity sensing function of sensors 30, 32 and the geometric configuration of member 18, sensors 30, 32 are not required to physically and/or directly touch or contact the member 18 in order to determine the position of member 18, and thereby substantially minimize the potential degradation, fatigue or failure of apparatus 10 and transmission 14.

It is to be understood that the invention is not to be limited to the exact construction and/or method which has been illustrated and discussed above, but that various changes and/or modifications may be made without departing from the spirit and scope of the invention.

What is claimed is:

1. An apparatus for use in combination with a transmission shift rail and adapted to measure the position of the shift rail having a longitudinal axis, which is contained within a transmission assembly, said apparatus comprising:
    a member secured to said shift rail the member including a first conical outer surface concentric with the axis, and a second cylindrical spiral outer surface disposed about the axis;
    a pair of sensors including a first sensor generating a first signal representing a distance between said first sensor the first surface as said shift rail rotates about the axis and a second sensor generating a second signal presenting a distance between said second sensor and the second surface as said shift rail moves along the axis; and
    a controller communicatively coupled to said pair of sensors, receiving said first and said second signals, and determining the position of said shift rail by use of said first and second signals.

2. The apparatus of claim 1 wherein said first sensor comprises an inductive proximity sensor.

3. The apparatus of claim 1 wherein said first sensor comprises an optical proximity sensor.

4. The apparatus of claim 1 wherein said first surface is semi-conical in shape.

5. The apparatus of claim 1 wherein said second surface is radially ramped.

6. The apparatus of claim 1 wherein said transmission assembly selectively operates in a plurality of gear engagements, and wherein said determined position of said shift rail corresponds to a unique one of said plurality of said gear engagements.

7. An apparatus for use in combination with a transmission shift rail and adapted to determine the angular and linear positions of said shift rail, said apparatus comprising:

a member surrounding and secured to said shift rail, said member having a longitudinally tapered outer surface and a radially tapered outer surface;

a first sensor which is remotely disposed from said longitudinally tapered surface, said first sensor being effective to measure a first distance between said longitudinally tapered surface and said first sensor, and to generate a first signal having a value corresponding to said first distance;

a second sensor which is disposed remotely from said radially tapered surface, said second sensor being effective to measure a second distance between said second sensor and said radially tapered surface and said second sensor, and to generate a second signal having a value corresponding to said second distance; and a controller which receives said first and second signals and utilizes said received signals to determine said angular position and said linear position of said shift rail.

8. The apparatus of claim 7 wherein said shift rail is disposed within a transmission assembly which selectively operates in a plurality of gear engagements, and wherein said controller further determines one of said plurality of gear engagements in which said transmission assembly is operating, said determination being based upon said linear and said angular position of said shift rail.

9. The assembly of claim 8 wherein said transmission assembly includes a detent plate having a plurality of grooves, and wherein said member includes a rod which selectively engages said grooves.

10. The assembly of claim 7 wherein said first sensor and said second sensor each comprises an inductive proximity sensor.

11. The assembly of claim 7 wherein said first sensor and second sensor each comprises a linear voltage displacement transducer.

12. The apparatus of claim 7 wherein said first and said second sensor each comprises an optical sensor.

13. A method for determining the position of a transmission shift rail, said method comprising the steps of:

providing a member having a conical, radially tapered outer surface, and a cylindrical spiral outer surface;

providing first and second proximity sensors;

securing said member to the shift rail;

disposing the first proximity sensor remote from said conical surface;

disposing the second proximity sensor remote from the cylindrical spiral surface;

remotely measuring the distance from said first sensor to said conical surface;

remotely measuring the distance from the second sensor to the cylindrical spiral surface; and determining said position of said shift rail based upon said measured distances.

14. The method of claim 13 wherein said step of providing proximity sensors further comprises an inductive proximity sensor the step of:

providing an inductive proximity sensor.

15. The method of claim 13 wherein said step of providing proximity sensors further comprises the step of:

providing an optical proximity sensor.

16. The method of claim 13 further comprising the steps of:

generating at least one signal corresponding to said at least one measured distance; and providing a controller which receives said at least one generated signal and which utilizes said at least one generated signal to determine said position of said shift rail.

* * * * *